US012777461B2

(12) United States Patent
Kim et al.

(10) Patent No.: US 12,777,461 B2
(45) Date of Patent: Oct. 27, 2026

(54) ELECTRONIC DEVICE AND METHOD FOR PROVIDING PREDICTED TRACKING AREA LIST IN WIRELESS COMMUNICATION SYSTEM

(71) Applicant: Samsung Electronics Co., Ltd., Suwon-si (KR)

(72) Inventors: Bokkeun Kim, Suwon-si (KR); Gyeongsik Kim, Suwon-si (KR); Jin Kim, Suwon-si (KR); Yongjun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 347 days.

(21) Appl. No.: 18/506,274

(22) Filed: Nov. 10, 2023

(65) Prior Publication Data

US 2024/0098695 A1 Mar. 21, 2024

Related U.S. Application Data

(63) Continuation of application No. PCT/KR2023/013541, filed on Sep. 8, 2023.

(30) Foreign Application Priority Data

Sep. 16, 2022 (KR) ........................ 10-2022-0116988

(51) Int. Cl.
*H04W 68/02* (2009.01)
*H04W 60/00* (2009.01)
*H04W 64/00* (2009.01)

(52) U.S. Cl.
CPC ........... *H04W 68/02* (2013.01); *H04W 60/00* (2013.01); *H04W 64/00* (2013.01)

(58) Field of Classification Search
CPC ...... H04W 68/02; H04W 60/00; H04W 64/00
See application file for complete search history.

(56) References Cited

U.S. PATENT DOCUMENTS

| | | | |
|---|---|---|---|
| 8,571,583 | B2 | 10/2013 | Tontinuttananon et al. |
| 11,265,696 | B2 | 3/2022 | Zou et al. |

(Continued)

FOREIGN PATENT DOCUMENTS

| | | |
|---|---|---|
| CN | 112243590 A | 1/2021 |
| CN | 113316087 | 8/2021 |

(Continued)

OTHER PUBLICATIONS

3GPP TR 23.737 V17.2.0 (Mar. 2021); Study on architecture aspects for using satellite access in 5G (Release 17); Partinent Pages: [pp. 36-39; chapters 6.7-6.7.4].*

(Continued)

*Primary Examiner* — Rafael Pérez-Gutiérrez
*Assistant Examiner* — Gilbert M. Grant
(74) *Attorney, Agent, or Firm* — NIXON & VANDERHYE P.C.

(57) ABSTRACT

In various embodiments, a method performed by a mobility management device, includes obtaining mobility information of a user equipment (UE). The method includes generating a predicted tracking area list for the UE based on the mobility information. The method includes transmitting, to the UE, a message including the predicted tracking area list to initiate a registration procedure based on the UE being out of a range of a plurality of tracking areas of the predicted tracking area list. The method includes based on identifying downlink data for the UE, performing a paging procedure in each of cells in the predicted tracking area list.

20 Claims, 15 Drawing Sheets

(56) References Cited

U.S. PATENT DOCUMENTS

| | | | | |
|---|---|---|---|---|
| 11,589,210 | B2 | 2/2023 | Wang | |
| 2013/0316706 | A1 | 11/2013 | Knauft | |
| 2017/0188184 | A1* | 6/2017 | Acharya | H04W 52/0209 |
| 2021/0336687 | A1* | 10/2021 | Pezeshki | G06N 3/09 |
| 2022/0046512 | A1 | 2/2022 | Berliner et al. | |
| 2024/0089900 | A1* | 3/2024 | Hao | H04W 8/08 |

FOREIGN PATENT DOCUMENTS

| | | | |
|---|---|---|---|
| CN | 113784286 | | 12/2021 |
| CN | 114286367 | | 4/2022 |
| JP | 6396811 | B2 | 9/2018 |
| KR | 102133342 | B1 | 7/2020 |
| KR | 102182793 | B1 | 11/2020 |
| KR | 10-2023-0157837 | | 11/2023 |
| WO | 2009/055991 | | 5/2009 |

OTHER PUBLICATIONS

ETSI TS 123 501 V17.5.0 (Jul. 2022); 5G; System architecture for the 5G System (5GS); (3GPP TS 23.501 version 17.5.0 Release 17; Partinent Pages: [p. 96, paragraph 5 and p. 447, paragraph 2].*

Search Report and Written Opinion dated Dec. 12, 2023 issued in International Patent Application No. PCT/KR2023/013541.

3GPP TSG SA, "Self-optimization of assigned TA list from reported list of last visited TAs", Meeting Notes, Meeting #59, Aug. 27-31, 2007, 5 pages.

Extended European Search Report for EP Application No. 23865802.5 dated Nov. 26, 2025, 18 pages.

3GPP TSG-SA WG2 Meeting #127bis, May 28-Jun. 1, 2018, S2-185254, CATT "Solution for optimizing registration area management based on NWDAF output" vol. SA WG2, 3 pages.

3GPP TR 23.791 V16.2.0, 3rd Generation Partnership Project; Technical Specification Group Services and System Aspects; Study of Enablers for Network Automation for 5G, Release 16, Jun. 2019, 124 pages.

3GPP TS 23.501 V17.5.0, 3rd Generation Partnership Project; Technical Specification Group Services and System Aspects; System architecture for the 5G System (5GS); Stage 2, Release 17, Jun. 2022, 568 pages.

3GPP TS 23.401 V17.5.0, 3rd Generation Partnership Project; Technical Specification Group Services and System Aspects; General Packet Radio Service (GPRS) enhancements for Evolved Universal Terrestrial Radio Access Network (E-UTRAN) access, Release 17, Jun. 2022, 452 pages.

3GPP TS 23.502 V17.5.0, 3rd Generation Partnership Project; Technical Specification Group Services and System Aspects; Procedures for the 5G System (5GS); Stage 2, Release 17, Jun. 2022, 744 pages.

3GPP TS 24.501 V17.7.1, 3rd Generation Partnership Project; Technical Specification Group Core Network and Terminals; Non-Access-Stratum (NAS) protocol for 5G System (5GS); Stage 3, Release 17, Jun. 2022, 991 pages.

3GPP TS 24.301 V17.7.0, 3rd Generation Partnership Project; Technical Specification Group Core Network and Terminals; Non-Access-Stratum (NAS) protocol for Evolved Packet System (EPS); Stage 3, Release 17, Jun. 2022, 607 pages.

* cited by examiner

950

ELECTRONIC DEVICE AND METHOD FOR PROVIDING PREDICTED TRACKING AREA LIST IN WIRELESS COMMUNICATION SYSTEM

CROSS-REFERENCE TO RELATED APPLICATIONS

This application is a continuation of International Application No. PCT/KR2023/013541 designating the United States, filed on Sep. 8, 2023, in the Korean Intellectual Property Receiving Office and claiming priority to Korean Patent Application No. 10-2022-0116988, filed on Sep. 16, 2022, in the Korean Intellectual Property Office, the disclosures of which are incorporated by reference herein in their entireties.

BACKGROUND

Field

The disclosure relates to a wireless communication system, and for example, to an electronic device and method for providing a predicted tracking area list in a wireless communication system.

Description of Related Art

A service area by a mobile communication network is divided into multiple tracking areas. For mobility management of user equipment (UE), paging messages broadcast in the multiple tracking areas and a tracking area update procedure of an electronic device moving from one tracking area to another tracking area may be used.

The above information is presented as background information only to assist with an understanding of the disclosure. No determination has been made, and no assertion is made, as to whether any of the above might be applicable as prior art with regard to the disclosure.

SUMMARY

According to an example embodiment, a method performed by a mobility management device, may comprise obtaining mobility information of a user equipment (UE). The method may comprise generating a predicted tracking area list for the UE based on the mobility information. The method may comprise transmitting, to the UE, a message including the predicted tracking area list to initiate a registration procedure based on the UE being out of a range of a plurality of tracking areas of the predicted tracking area list. The method may comprise, based on identifying downlink data for the UE, performing a paging procedure in each of cells in the predicted tracking area list.

According to an example embodiment, a mobility management device may comprise at least one transceiver, and at least one processor coupled to the at least one transceiver. The at least one processor may be configured to obtain mobility information of a user equipment (UE). The at least one processor may be configured to generate a predicted tracking area list for the UE based on the mobility information. The at least one processor may be configured to control the at least one transceiver to transmit, to the UE, a message including the predicted tracking area list to initiate a registration procedure based on the UE being out of a range of a plurality of tracking areas of the predicted tracking area list; and the at least one processor may be configured to, based on identifying downlink data for the UE, perform a paging procedure in each of cells in the predicted tracking area list.

According to various example embodiments, a non-transitory computer-readable medium is provided. The non-transitory computer-readable medium is provisioned with program instructions that, when executed by one or more processors, cause a mobility management device to perform functions comprising obtaining mobility information of a user equipment (UE), generating a predicted tracking area list for the UE based on the mobility information, transmitting, to the UE, a message including the predicted tracking area list to initiate a registration procedure based on the UE being out of a range of a plurality of tracking areas of the predicted tracking area list, and based on identifying downlink data for the UE, performing a paging procedure in each of cells in the predicted tracking area list.

BRIEF DESCRIPTION OF THE DRAWINGS

The above and other aspects, features and advantages of certain embodiments of the present disclosure will be more apparent from the following detailed description, taken in conjunction with accompanying drawings, in which.

DETAILED DESCRIPTION

Figure 1A:
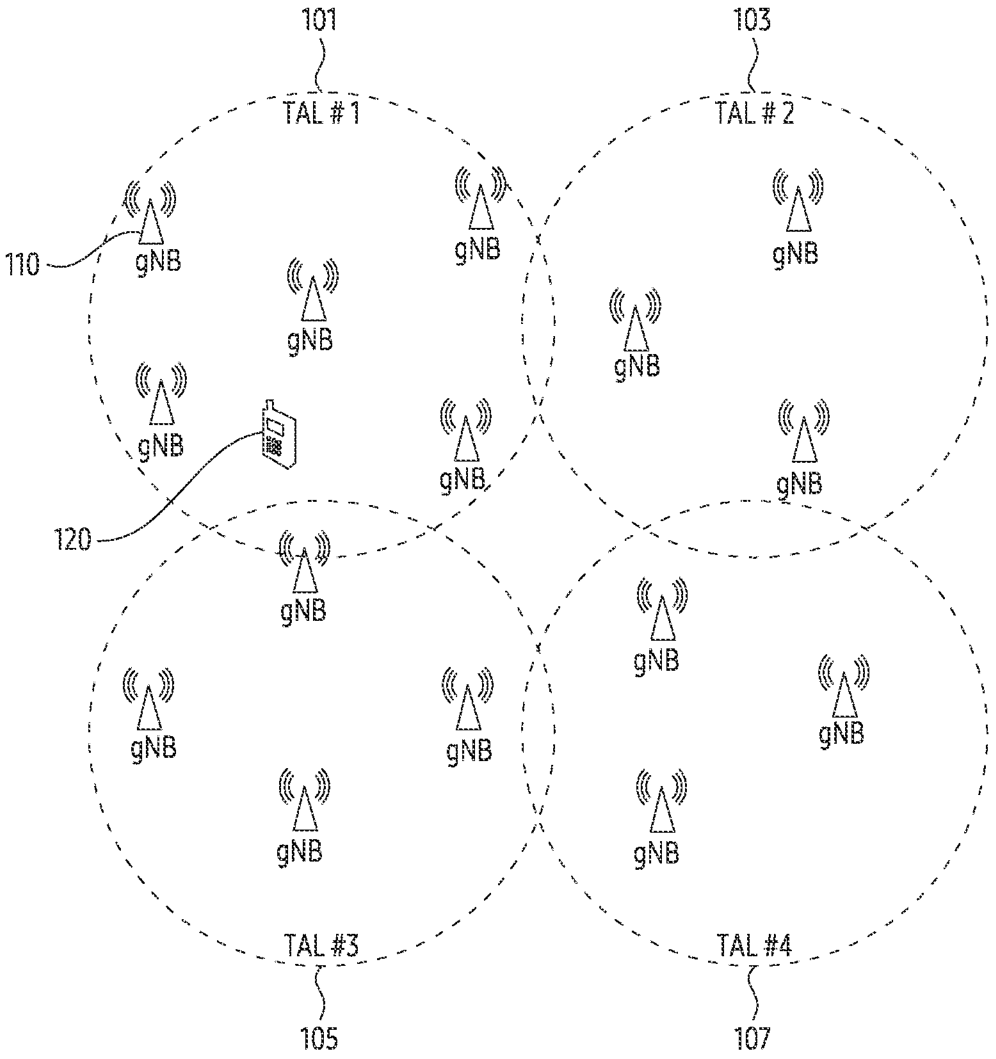
FIG. 1A is a diagram illustrating an example of tracking area lists (TALs)

Terms used in the present disclosure are used to describe various example embodiments and are not intended to limit the scope of the various example embodiments. A singular expression may include a plural expression unless it is clearly meant differently in the context. The terms used herein, including a technical or scientific term, may have the same meaning as generally understood by a person having ordinary knowledge in the technical field described in the present disclosure. Terms defined in a general dictionary among the terms used in the present disclosure may be interpreted with the same or similar meaning as a contextual meaning of related technology, and unless clearly defined in the present disclosure, it is not interpreted in an ideal or excessively formal meaning. In some cases, even terms defined in the present disclosure should not be interpreted to exclude embodiments of the present disclosure.

In various embodiments of the present disclosure described below, a hardware approach is described as an example. However, since the various embodiments of the present disclosure include technology that uses both hardware and software, the various example embodiments of the present disclosure do not exclude a software-based approach.

A term that refers to a signal (e.g., signal, information, message, signaling), a term that refers to an area (e.g., service area, serving area, zone, tracking area, predicted tracking area), a term that refers to a data type (e.g., list, set, array, information), a term for an operational state (e.g., step, operation, procedure), a term that refers to data (e.g., packet, user stream, information, bit, symbol, codeword), a term that refers to a channel, a term that refers to network entities, a term that refers to a component of a device, and the like used in the following description are illustrated for convenience of description. Accordingly, the present disclosure is not limited to terms described below, and another term having an equivalent technical meaning may be used.

In addition, in the present disclosure, in order to determine whether a specific condition is satisfied or fulfilled, an expression of more than or less than may be used, but this is only a description for expressing an example, and does not exclude description of more than or equal to or less than or equal to. A condition described as 'more than or equal to' may be replaced with ' more than', a condition described as 'less than or equal to' may be replaced with 'less than', and a condition described as 'more than or equal to and less than' may be replaced with 'more than and less than or equal to'. In addition, hereinafter, 'A' to 'B' may denote that at least one of elements from A (including A) and to B (including B). Hereinafter, 'C' and/or 'D' may denote at least one of 'C' or 'D', that is, {'C', 'D', 'C' and 'D'}.

The present disclosure describes various embodiments using terms used in various communication standards (e.g., 3rd Generation Partnership Project (3GPP), European Telecommunications Standards Institute (ETSI), extensible radio access network (xRAN), and open-radio access network (O-RAN), but this is only an example for description. Various embodiments of the present disclosure may be easily modified and applied to other communication systems as well.

A tracking area may refer, for example, to an area used to manage a position of a terminal (e.g., user equipment (UE)) in a mobile communication network. For example, in a 4G or 5G network of 3GPP, a tracking area list (TAL) is used to manage the position of the UE. Even in case that the UE is in an idle mode, when the TAL is changed, the UE may notify a core network of the changed position information through a tracking area update or registration procedure. Thus, the UE is guaranteed to be within the TAL even in the idle mode. Hereinafter, in the present disclosure, the TAL may have the same or similar meaning as a tracking area identity (TAI) list (TAI list).

An electronic device for mobility management in the core network may include a mobility management entity (MME) or an access and mobility management function (AMF). The electronic device may use the TAL in a paging procedure for finding the UE in the idle mode.

As a wireless communication system continues to develop, the number of base stations increases and the number of required tracking areas increases. This demand causes a burden on mobility management of the mobile communication network UE. Machine learning and various algorithms in the field of artificial intelligence (AI) may be used to predict the expected position and staying time of the UE. In order to address the above-described problem, embodiments of the present disclosure describe a technique for providing a predicted tracking area list (pTAL) (or predicted registration area) differentiated for each UE based on the above prediction result. The tracking area in the predicted tracking area list may be referred to as a predicted tracking area. The predicted tracking area list may be configured to have a smaller size than another TAL. Signaling in the paging may be reduced through the predicted tracking area list. In addition, even if the UE is positioned outside another TAL, in case that it is within a range of the predicted tracking area list, the registration procedure may not be performed. Thus, the frequency of occurrence of the registration procedure may be greatly reduced.

FIG. 1A is a diagram illustrating an example of tracking area lists (TALs). In FIG. 1A, a base station and a terminal are illustrated as a part of nodes using a wireless channel in a wireless communication system.

Referring to FIG. 1A, a base station 110 is a network infrastructure that provides wireless access to a terminal 120. The base station 110 has coverage defined based on a distance capable of transmitting a signal. The base station 110 may be referred to as access point (AP), eNodeB (eNB), 5th generation node, next generation nodeB (gNB), wireless point, transmission/reception point (TRP), or other terms having equivalent technical meaning, in addition to the base station. Hereinafter, in describing UE mobility of the present disclosure, the base station is referred to as the gNB and described, however, it will be understood that other terms may be used according to a communication environment or an embodiment.

The terminal 120 is a device used by a user and performs communication with the base station 110 through the wireless channel A link from the base station 110 to the terminal 120 is referred to as downlink (DL), and a link from the terminal 120 to the base station 110 is referred to as uplink (UL). In addition, although not illustrated in FIG. 1A, the terminal 120 and another terminal may perform communication through a wireless channel between the terminal 120 and another terminal. At this time, a link between the terminal 120 and another terminal (device-to-device link, D2D) is referred to as a sidelink, and the sidelink may be used interchangeably with the PC5 interface. In various embodiments, the terminal 120 may be operated without user involvement. According to an embodiment, the terminal 120 may refer, for example, to a device that performs machine type communication (MTC) and may not be carried by a user. In addition, according to an embodiment, the terminal 120 may be a narrowband (NB)-internet of things (IoT) device. The terminal 120 may be referred to as user equipment (UE), customer premises equipment (CPE), mobile station, subscriber station, remote terminal, wireless terminal, electronic device, or user device, or other terms having equivalent technical meanings, in addition to the terminal. Hereinafter, in describing the mobility of the terminal of the present disclosure, the terminal is referred to as the UE and described, however, it will be understood that other terms may be used according to a communication environment or an embodiment.

The network requires tracking areas. The tracking area is a basic unit for tracking the UE at the core network level. The tracking area may be identified by a tracking area identity (TAI) broadcast within cells of the tracking area. The TAI may be configured with a tracking area code (TAC) and a public land mobile network (PLMN) identifier (ID). The UE in an idle mode may obtain the TAI through a system information block type 1 (SIB1). The tracking area of the TAI may be used for registration with a mobility management device (e.g., AMF, MME). The UE may report the current tracking area to the mobility management device through non-access stratum (NAS) signaling. The UE may provide the current tracking area to the mobility management device through a registration request message.

Registration area management may include a function of allocating and reallocating a registration area to the UE. The mobility management device (e.g., AMF, MME) may allocate the tracking area list, in other words, the TAL, to the UE through the NAS signaling. The mobility management device may provide the TAL to the UE through a registration accept message. When the UE registers in the network through 3GPP access, the mobility management device may allocate a set of the tracking areas of the TAI list to the UE. In other words, the mobility management device may allocate the registration area to the UE during a registration procedure. The registration area may refer, for example, to the set of the tracking areas, each tracking area may include one or more cells covering a geographical area. The concept of "registration for multiple tracking areas" may be applied within a 5G system (5GS). In order to reduce tracking area update signaling within the 5GS, the AMF may allocate a plurality of tracking areas to the UE. This tracking area provides a list of the tracking areas identified as the TAI list.

The mobility management device may take into account various information (e.g., mobility pattern and allowed/non-allowed area) when allocating the registration area, in other words, the set of the tracking areas in the TAI list to the UE. The 5G system may support allocation of the registration area using a single TAI list including the tracking areas of all NG-RAN nodes in the registration area for the UE. The UE may determine that it is registered in the list of the tracking areas, in other words, the TAL. As long as the UE remains in one of the tracking areas of the tracking area list received from the mobility management device, the UE does not need to trigger the registration procedure for the mobility and the periodic registration update (e.g., 5GS registration type information element (IE) set to "mobility registration update" in the registration request message) used for the mobility. Until a new TAI list is received through a new registration procedure, a periodic registration update procedure, or a general UE configuration update procedure, or until a command due to rejection or deregistration is received, the UE may determine that the currently allocated TAI list is valid.

In order to identify the position of the UE in the idle mode, the UE may perform the registration procedure whenever it is out of the TAL, in other words, whenever it is out of the registration area. The registration procedure may be configured with one TAL. In general, the TAL may be set as a fixed geographical area as illustrated in FIG. 1A. The mobility management device may select the one TAL for the UE from among the designated TALs and use it as the registration area. However, since the designated TALs are commonly operated based on the UEs, the registration area, which is one of the designated TALs, does not sufficiently reflect the mobility pattern of the UE. In addition, since the TAL is also used in a paging procedure, it may be required to configure the TAL using the mobility pattern of the UE in order to reduce unnecessary paging signaling.

Figure 1B:
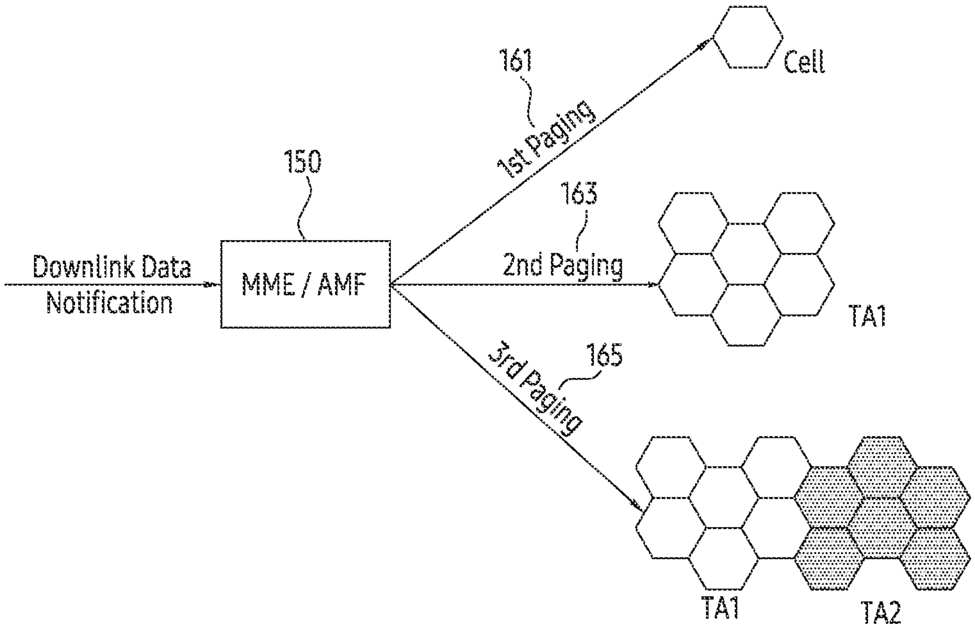
FIG. 1B is a diagram illustrating an example of paging.

FIG. 1B is a diagram illustrating an example of paging. The paging may refer, for example, to a procedure for transmitting a message in a network, in order to switch a UE in radio resource control (RRC) idle mode (or the UE in RRC inactive mode) to RRC connected mode. The paging may be performed by a mobility management device (e.g., MME or AMF) of a core network. In FIG. 1B, multi-step paging is described. The multi-step paging may refer, for example, to a paging procedure that is repeatedly performed while increasing the broadcast range of a paging message step by step.

Referring to FIG. 1B, a mobility management device 150 may receive notification of downlink data. The mobility management device 150 may initiate a procedure for changing a network connected mode of the UE to a RRC connected mode for the communication service of the UE. The mobility management device 150 may control the base station to broadcast the paging message in a cell in which the UE is expected to be positioned.

In operation 161, the mobility management device 150 is the first step of the multi-step paging procedure (e.g., primary paging), and may broadcast through the base station the paging message on the cell. The paging message may be broadcast to one or more UEs of the cell. In operation 163, the mobility management device 150 is the second step of the multi-step paging procedure (e.g., secondary paging), and may broadcast the paging message through the base stations on a tracking area. The paging message may be broadcast to the one or more UEs on the tracking area. The tracking area may include a plurality of cells. In operation 165, the mobility management device 150 is the third step of the multi-step paging procedure (e.g., tertiary paging), and may broadcast the paging message through the base stations on a plurality of tracking areas of the tracking area list. The paging message may be broadcast to the UEs with the plurality of tracking areas. Since it is guaranteed that the UE is within the TAL in the RRC idle mode, the UE that has received the paging message may operate in the RRC connected mode and may resume service.

In FIG. 1B, a three-step paging procedure is described. Hereinafter, in order to explain the multi-step paging in the present disclosure, three-step paging has been described as an example, but the paging technique of the present disclosure is not limited thereto. Single paging, 2-step paging, or n-step (n is an integer of 4 or more) or more paging techniques may be used. In addition, in the last step of the paging procedure, the paging message may be broadcast on all tracking areas of the TAL.

Figure 2:
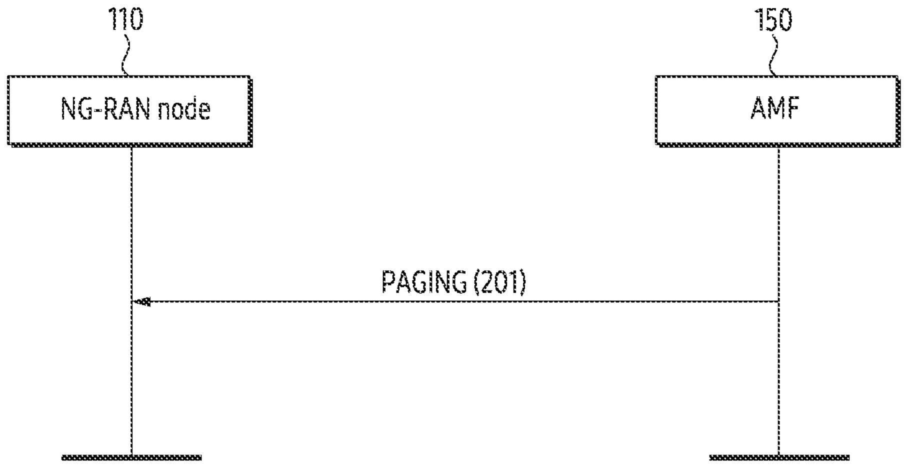
FIG. 2 is a signal flow diagram illustrating an example of a paging message.

FIG. 2 is a signal flow diagram illustrating an example of a paging message.

Referring to FIG. 2, a mobility management device 150 (e.g., MME, AFM) may transmit a paging message 201 to a base station 110 (e.g., a RAN node) through an N2 interface. The RAN node may be used as a term including a base station such as an NG-RAN node, gNB, eNB, and the like. The mobility management device 150 may initiate a paging procedure by transmitting the paging message 201 to the base station 110. The mobility management device 150 may transmit the paging message 201 to each base station belonging to a tracking area of a tracking area list (N2 interface). The base station 110 may provide one or more cells. When the paging message 201 is received by the base station 110, the base station 110 may obtain a TAI list for the paging IE. The base station 110 must perform paging of a UE in a cell belonging to the tracking area indicated by the TAI list. The base station 110 may broadcast the paging message to the UE (Uu interface).

The paging procedure and a registration procedure generate a lot of traffic in the 5G network. For example, the amount of traffic varies depending on a configuration of a TAL. In embodiments of the present disclosure, the TAL configured as a registration area for the registration procedure may be used as the TAL configured for the paging procedure. The TAL is determined based on a prediction result of a movement path of the UE and may be referred to as a predicted TAL (pTAL). The more cells belong to the pTAL, the less the number of the registration procedures, while the paging message is required for each cell, so the number of signaling of the entire paging procedure increases. In addition, the UEs that are in the boundary area of the pTAL or move at a high speed beyond the pTAL may perform more registration procedures than the UEs that are not. For example, in 5G, as the size of the cell becomes smaller and high-speed UEs such as autonomous vehicles and drones are added, the registration procedure and traffic due to the registration procedure increase significantly. In order to address this problem, an electronic device (e.g., MME, AMF) for mobility management according to various embodiments of the present disclosure may predict the position of the UE and may provide a predicted tracking area list (pTAL) (or predicted registration area) to the UE based on the prediction result.

Figure 3:
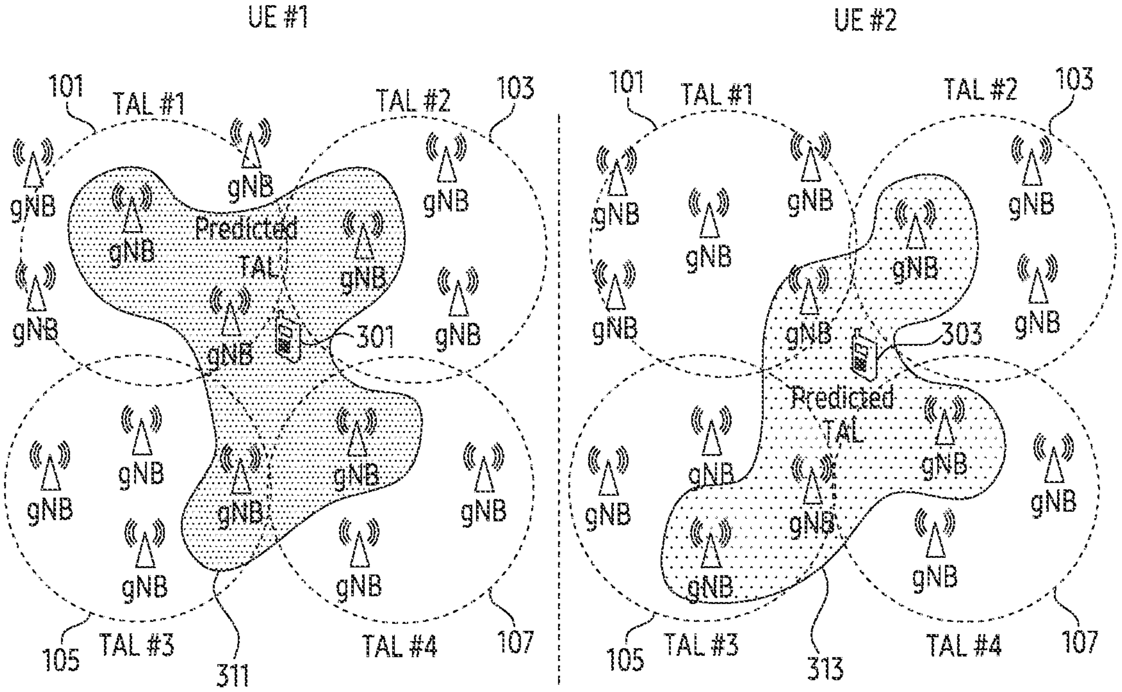
FIG. 3 is a diagram illustrating an example of a predicted tracking area list (pTAL)

FIG. 3 is a diagram illustrating an example of a predicted tracking area list (pTAL). A mobility management device (e.g., MME, AMF) according to embodiments may predict cells (or gNBs) in which the UE will stay in the future, based on the learning result of the previous movement path of the UE. The mobility management device may determine a TAL (hereinafter, the predicted TAL (the pTAL)) for the UE based on the cells (or the gNBs) predicted by a machine learning model. According to an embodiment, the mobility management device may configure the pTAL for each UE.

Referring to FIG. 3, the network may provide TAL #1 101, TAL #2 103, TAL #3 105, and TAL #4 107. Since the TALs are fixedly operated, the more diverse or complex the movement path of the UE, a registration area for the UE or a tracking area list for paging may not accurately reflect the actual movement of the UE. Thus, the mobility management device (e.g., the mobility management device 150) according to embodiments may allocate the pTAL for each UE. The mobility management device 150 may predict the movement path of the UE and may identify the cells (or a plurality of gNBs) based on the result of the prediction. The mobility management device 150 may configure the pTAL including tracking areas including the cells (or the gNBs). The gNB is a node for a 5G base station and may provide one or more cells. Hereinafter, in the present disclosure, the terms cell and the term base station (e.g., the gNB) may be used and written interchangeably, as a meaning for indicating a geographical area.

Even in the same network environment, the pTAL may be configured differently for each UE. For example, for a first UE 301, the mobility management device 150 may determine a first pTAL 311. The mobility management device 150 may allocate the first pTAL 311 to the first UE 301. The first pTAL 311 may be determined based on at least one of a previous access history of the first UE 301, a mobility pattern of the first UE 301, an access time (or a residence time) for each gNB of the first UE 301, or the paging history of the first UE 301. For a second UE 303, the mobility management device 150 may determine a second pTAL 313. The mobility management device 150 may allocate the second pTAL 313 to the second UE 303. The second pTAL 313 may be determined based on at least one of the previous access history of the second UE 303, the mobility pattern of the second UE 303, the access time (or the residence time) for each gNB of the second UE 303, or the paging history of the second UE 303.

According to an embodiment, the mobility management device 150 may perform a paging procedure based on the pTAL. The size of the pTAL may be smaller than that of another TAL (e.g., TAL #1 101, TAL #2 103, TAL #3 105, and TAL #4 107). For example, the size of the TAL may be defined as the number of the tracking areas included in the TAL. For another example, the size of the TAL may be defined as the number of the cells (or the gNBs). For still another example, the size of the TAL may refer, for example, to the size of a physical area covered by the tracking area of the TAL. Due to the size of the small pTAL, the number of required paging messages may be reduced.

According to an embodiment, the mobility management device 150 may allocate the pTAL for a registration procedure to the UE. Since the pTAL corresponds to the registration area, the pTAL may be referred to as a predicted registration area. Even if each UE moves from TAL (e.g., a general TAL, and not the pTAL) (e.g., TAL #1 101) to another TAL (e.g., a general TAL, not the pTAL) (e.g., TAL #4 107), it may not perform the registration procedure. For example, in case that the first UE 301 moves out of the geographical range of the first pTAL 311, it may perform the registration procedure. In addition, for example, even if the second UE 303 moves beyond the boundary area of TAL (e.g., TAL #1 101, TAL #2 103, TAL #3 105, and TAL #4 107), the UE 303 may not initiate the registration procedure if the UE 303 is within the range of the second pTAL 313. In other words, by allocating the pTAL reflecting the movement path of the UE, the number of the registration procedures in the network may be reduced.

Figure 4A:
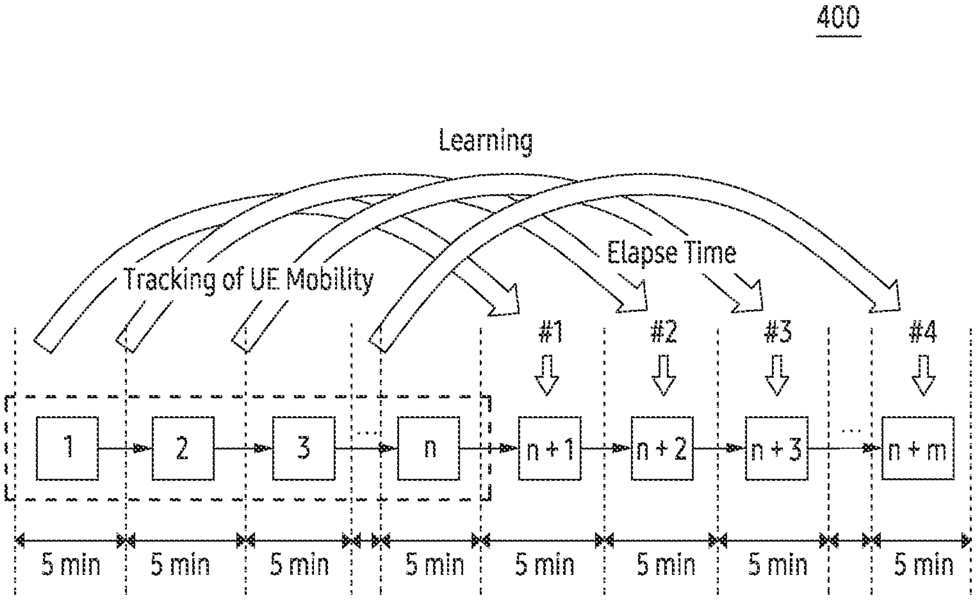
FIGS. 4A and 4B are diagrams illustrating an example of learning of user equipment (UE) mobility.
Figure 4B:
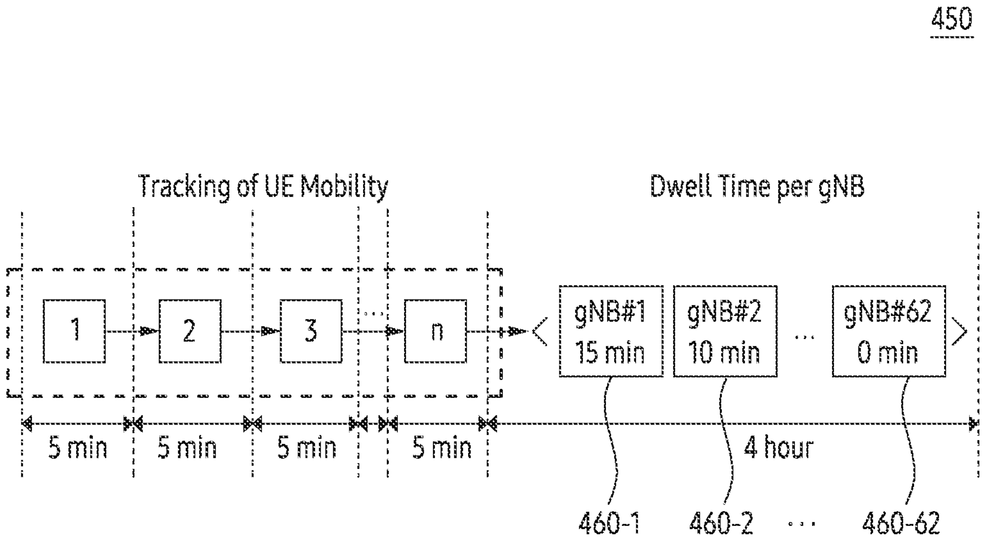

FIGS. 4A and 4B are diagrams illustrating an example of learning of user equipment (UE) mobility.

Referring to FIG. 4A, the UE mobility may be repeated and learned in a designated time unit (e.g., 5 minutes). Based on the learning result, the position of the UE may be predicted at a specific timing. This method may find the position of the UE over time with high accuracy. However, the method requires a lot of learning time and a lot of computational resources as the time to predict becomes longer. Thus, the method may be effective in predicting a tracking area used in secondary paging, but is not efficient due to excessive learning amount in paging (e.g., tertiary paging of FIG. 1B) for cells of TAL that requires a relatively long time. In addition, performing the prediction operation of the machine learning model for each paging also causes a burden on a consumption resource.

In order to address the above-described problem, the learning method of UE mobility according to embodiments may express a residence time (or an access time) for each gNB as one vector and use a single number of times of learning. Since the TAL is maintained for a long time, it is required to predict the UE mobility relatively far. Since the learning method using the residence time for each gNB learns with a single vector, it may provide a large learning amount reduction effect compared to the learning method based on the designated time unit. When the pTAL is allocated to the UE, the pTAL is maintained until the UE is out of the pTAL, so the computing device may not repeatedly perform operations for predicting a predicted movement path of the UE and related tracking areas every regular time.

Referring to FIG. 4B, the computing device for learning may perform UE mobility tracking per unit time and may use the performance result as input data. By being connecting previous position paths in time units (e.g., 5 minutes) for each UE, one sequence (hereinafter, mobility sequence information) for each UE may be generated as input data for learning. For example, 1 to n may refer, for example, to the index (e.g., tracking area, RAN area, gNB, cell) of the path that the UE has moved every unit time.

A mobility management device (e.g., AMF, MME) or a computing device (e.g., network data analytics function (NWDAF)) (hereinafter, an electronic device) for the mobility management device may generate output data based on the input data. According to an embodiment, the output data may refer, for example, to the residence time for each gNB of the UE. The mobility management device or the computing device for the mobility management device may obtain the residence time for each gNB of the UE based on mobility sequence information of the UE. The output may be configured with one vector. The value of each vector may be expressed as the gNB and the residence time in the gNB. For example, the position of an element of the vector may indicate a sequential gNB ID, and the value of the element may indicate the residence time of the UE corresponding to the gNB ID. The output data may include the residence time for each gNB within a designated time (e.g., 4 hours). For example, a total of 62 gNBs (gNB #1 460-1, gNB #2 460-2, . . . , gNB #62 460-62) may be learning targets for UE mobility. The residence time corresponding to each gNB may be determined as an element value of the vector. For example, the residence time corresponding to gNB #1 460-1 may be determined to be 15 minutes, sequentially, and the residence time corresponding to gNB #2 460-2 may be determined to be 10 minutes. Learning time and learning amount may be greatly reduced by expressing the position of the UE by time as one vector instead of the existing method of expressing the position of the UE by time as a continuous sequence.

Figure 5:
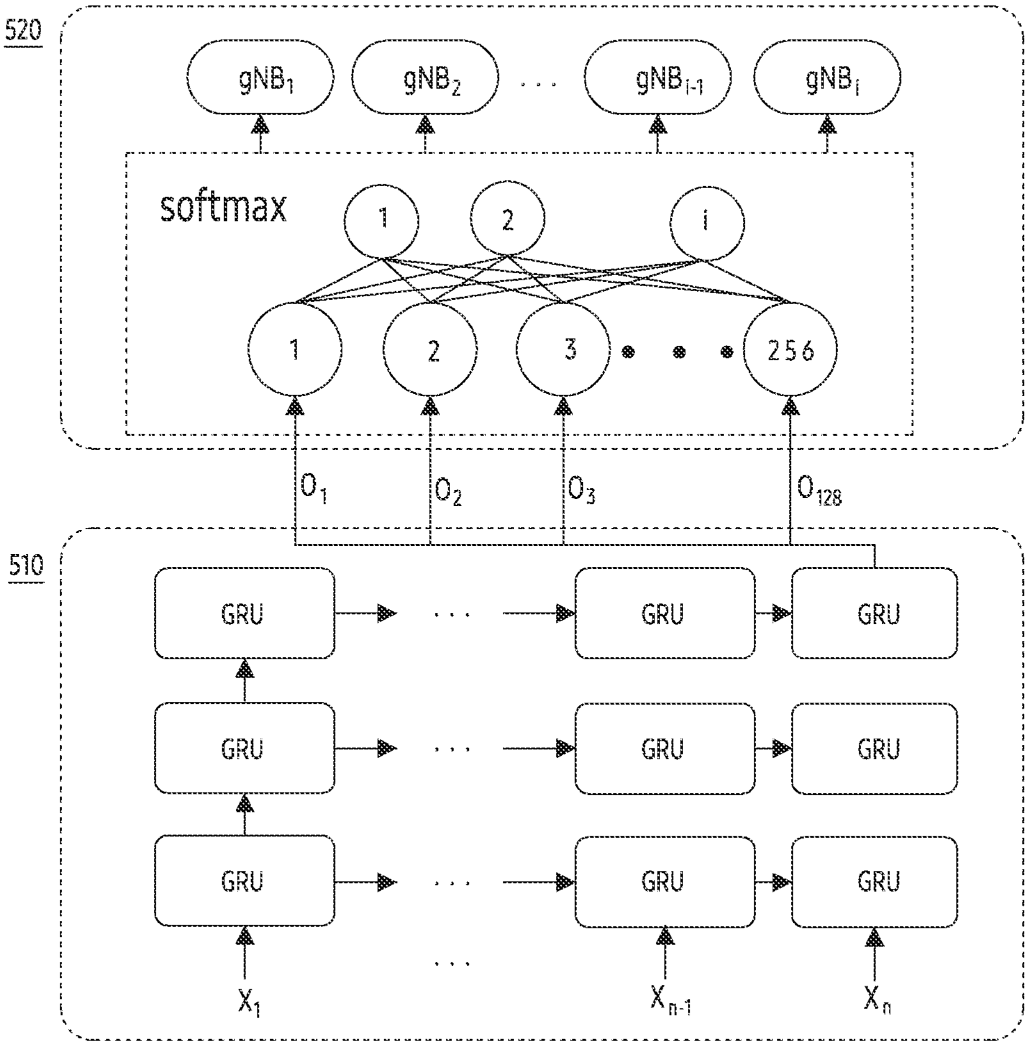
FIG. 5 is a diagram illustrating an example of a machine learning model.

FIG. 5 is a diagram illustrating an example of a machine learning model.

Referring to FIG. 5, as an example of the machine learning model, a stacked recurrent neural network (RNN) 510 (e.g., using a gated recurrent unit (GRU)) for learning sequential inputs and a Fully Connected (FC) neural network 520 for generating outputs may be used. The RNN may refer, for example, to an RNN-based AI model, and RNN-based models such as long short-term memory (LSTM) or GRU may be used. Meanwhile, FIG. 5 is merely an example and may be replaced with another AI model other than the RNN for machine learning according to embodiments of the present disclosure.

The Stacked GRU 510 may be configured with three layers including GRU cells for each time in each layer. The three layers may include a first layer, a second layer, and a third layer in order from bottom to top. The first layer is an input layer for receiving a previous position path Xn of the UE. In the input layer, Xn inputted to each GRU cell indicates previous position information at a fixed time interval, and may be sequentially inputted from X1 to Xn as long as the length of the input sequence. The second layer and the third layer may be hidden layers that are not involved in input and output. Three layers were described in FIG. 5, but the number of layers (e.g., three) and the number of nodes (e.g., n) of the Stacked GRU 510 may be set to optimal values according to the application environment. Since the output of GRU cells at a node is passed both to the next step (from time 'm' to time 'm+1') and to the next layer (e.g., from second layer to third layer), the output of the last GRU cell of the top layer becomes the final output of the stacked GRU 510.

The output layer of the disclosed machine learning model, using the FC neural network 520, indicates the time that the UE will stay in the corresponding gNB, for a designated time (e.g., 4 hours) for each gNB as a percentage (%). The FC neural network 520 may receive the output of the stacked GRU 510 as the input. The FC neural network 520 may generate output data as much as i, which is the number of gNBs to be predicted. The softmax activation function used in the FC neural network 520 outputs a value normalized between 0 and 1 based on an input value, and has a characteristic that the sum of the values is always 1. Accordingly, the values of the output data indicate the residence time for each gNB of the UE as a ratio (%). According to an embodiment, based on the prediction result of the movement path of the UE, the mobility management device (e.g., AMF, MME) may allocate the pTAL for each UE.

Figure 6:
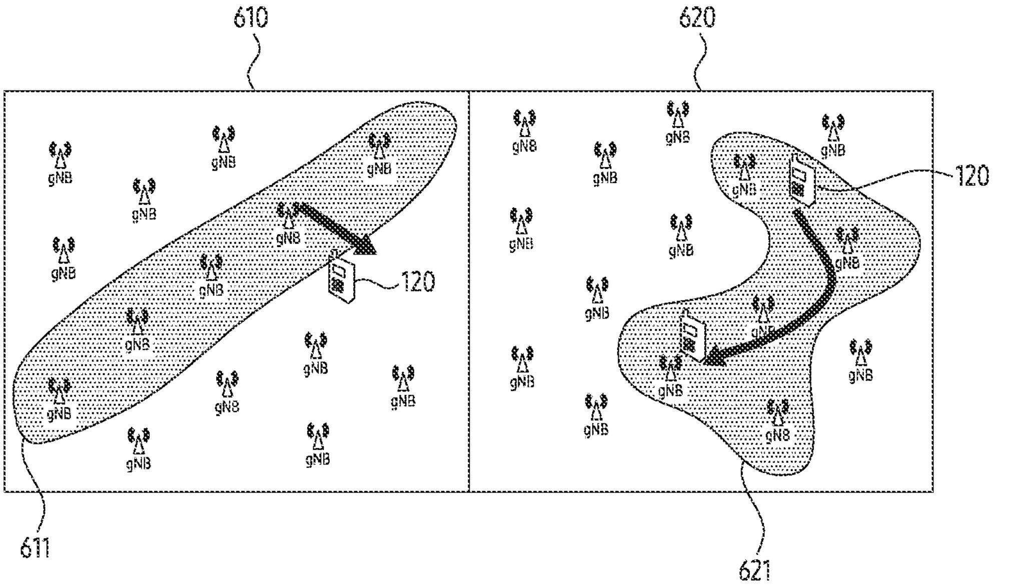
FIG. 6 is a diagram illustrating an example of a change in a predicted tracking area according to movement of a UE.

FIG. 6 is a diagram illustrating an example of a change in a predicted tracking area according to movement of a UE. The UE exemplifies a terminal 120. The predicted tracking area may refer, for example, to a tracking area including a pTAL. Existing a TA and a TAL are used as basic units for managing and configuring a network in a core network. The pTAL according to embodiments of the present disclosure may be configured independently of the TAL for a paging procedure and a registration procedure. The pTAL may function as a registration area of the registration procedure and at the same time may function as the TAL for the paging procedure. In order to reduce the influence of the configuration of the pTAL on other information (e.g., IEs) or other procedures, the pTAL may be operated together with existing TAL.

Referring to FIG. 6, the pTAL is UE-specific to manage the mobility of the UE. For example, in the network environment 610, a first pTAL 611 for the UE 120 may be allocated to the UE 120. For example, the pTAL may be generated by configuring a list in the order of gNB in which the UE 120 is expected to stay for a long time. Once the first pTAL 611 is allocated, the allocated first pTAL 611 is valid until the UE 120 is out of the area of the first pTAL 611. In case that the UE 120 moves within the geographical range (e.g., a geographical area covered by cells of the first pTAL) of the first pTAL 611, the UE 120 may not perform the registration procedure. When the UE 120 moves out of the tracking areas of the first pTAL 611, the UE 120 may initiate the registration procedure. To initiate the registration procedure, the UE 120 may transmit a registration request message to a mobility management device (e.g., AMF, MME). The mobility management device may transmit a registration accept message, a registration rejection message, or a registration failure message to the UE 120. According to an embodiment, the registration accept message may include changed pTAL information (e.g., a second pTAL 621 to be described later).

The pTAL may be dynamically changed according to the movement of the UE. When the UE 120 moves out of the range of the tracking areas of the first pTAL 611, the mobility management device may reallocate the pTAL of the UE 120.

In the mobility management device, when the UE 120 moves out of the range of the tracking areas of the first pTAL 611, the UE 120 may transmit the registration request message to the mobility management device. Thus, upon receiving the registration request message, the mobility management device may identify that the UE 120 is positioned out of the range of the tracking areas of the first pTAL 611. The mobility management device may identify that allocation of a new pTAL is requested to the UE 120. The mobility management device may determine the new pTAL based on identifying that the UE 120 is out of range of the tracking areas of the first pTAL 611. The mobility management device may determine the second pTAL 621, which is a new pTAL, based on the machine learning result. The second pTAL 621 may be determined based on at least one of a previous access history of the UE 120, a mobility pattern of the UE 120, an access time (or a residence time) for each gNB of the UE 120, or a paging history of the UE 120. The mobility management device may allocate the second pTAL 621 to the UE 120.

Although not illustrated in FIG. 6, according to an embodiment, the pTAL may be indicated by being included in the message as an IE in the form of a list in the same manner as the TAL. For example, the registration accept message may include the pTAL instead of the registration area. In other words, the registration area may be replaced with the pTAL. According to an embodiment, indication information for indicating that it is the pTAL may be used. Based on receiving the pTAL from the AMF, the UE or RAN node may use the indication information to distinguish whether it is the TAL or the pTAL. The message including the pTAL may further include the indication information.

Figure 7A:
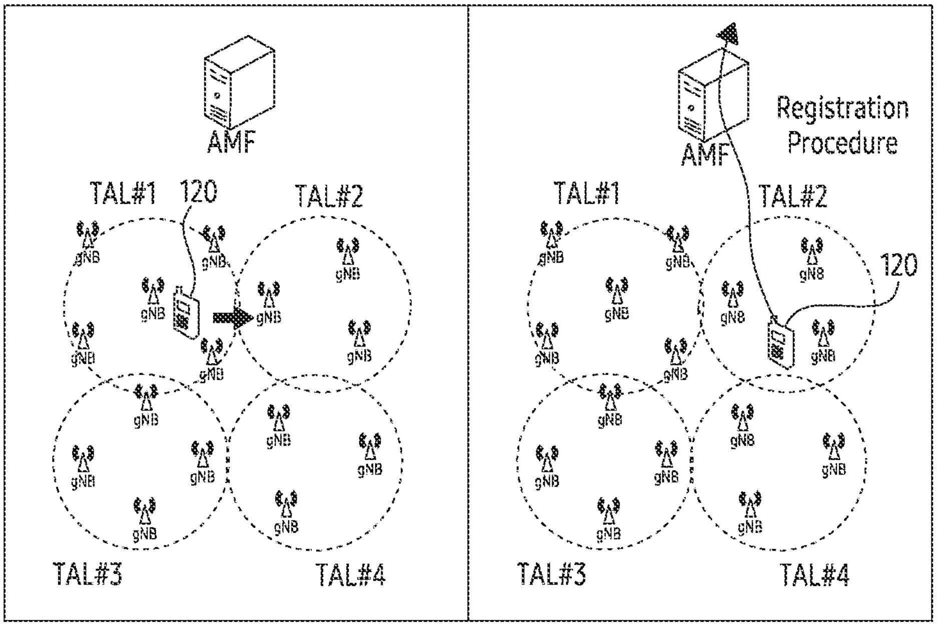
FIGS. 7A and 7B are diagrams illustrating an example of a predicted tracking area and a registration procedure.
Figure 7B:
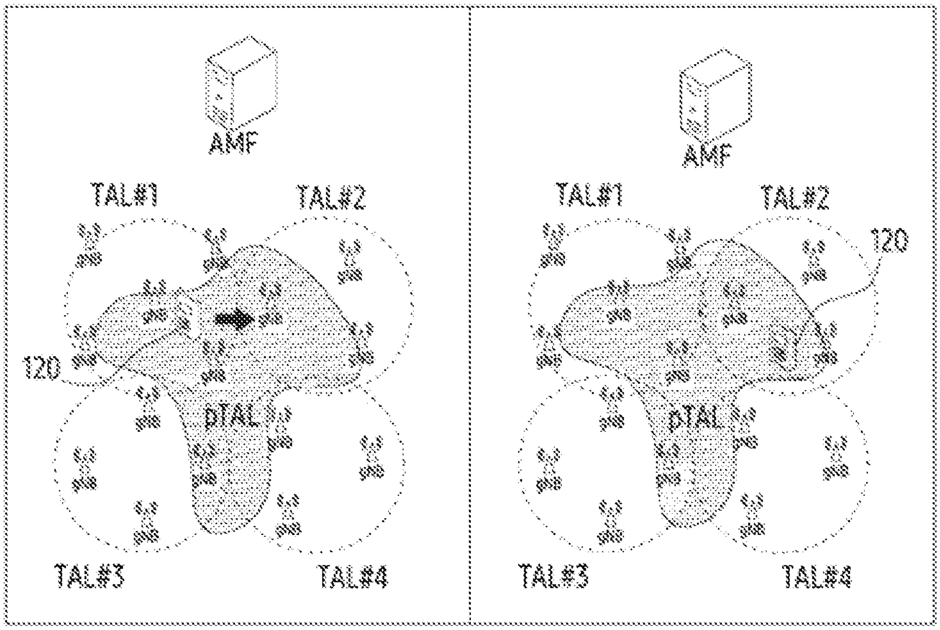

FIGS. 7A and 7B are diagrams illustrating an example of a predicted tracking area and a registration procedure. As a network entity for mobility management, AMF is illustrated.

Referring to FIG. 7A, the AMF may manage mobility of a UE 120. The AMF may use a plurality of TALs (e.g., TAL #1, TAL #2, TAL #3, and TAL #4). The AMF may allocate one TAL (e.g., the TAL #1) among the plurality of TALs as a registration area for the UE 120. When the UE 120 is out of the assigned TAL (e.g., the TAL #1), the UE 120 may perform the registration procedure. In this case, a UE positioned in the boundary area of the TAL or moving beyond the TAL may generate signaling for the registration procedure.

Referring to FIG. 7B, a pTAL using a predicted tracking area may be allocated. A predicted movement path may be different for each UE. The AMF may provide a virtual TAL, in other words, the pTAL, which is different for each UE. The pTAL may include cells (or gNBs) corresponding to the predicted movement path of the UE. The pTAL may include tracking areas of cells associated with a geographical area of the predicted movement path of the UE or base stations (e.g., the gNBs) providing the cells.

According to an embodiment, since the UE 120 moving (e.g., moving from the TAL #1 to the TAL #2) between TALs moves within the pTAL range, it may not perform the registration procedure. Since the occurrence frequency of the registration procedure for UEs moving beyond the boundary area of the TAL is reduced, overall signaling may be reduced. According to an embodiment, the area of the pTAL may be formed across between tracking areas of different TALs (e.g., the TAL #1, the TAL #2). For example, some of the cells (or gNBs) included in the pTAL may be included in the tracking area of the TAL #1, and other some of the cells (or gNBs) included in the pTAL may be included in the tracking area of the TAL #3.

Figure 8:
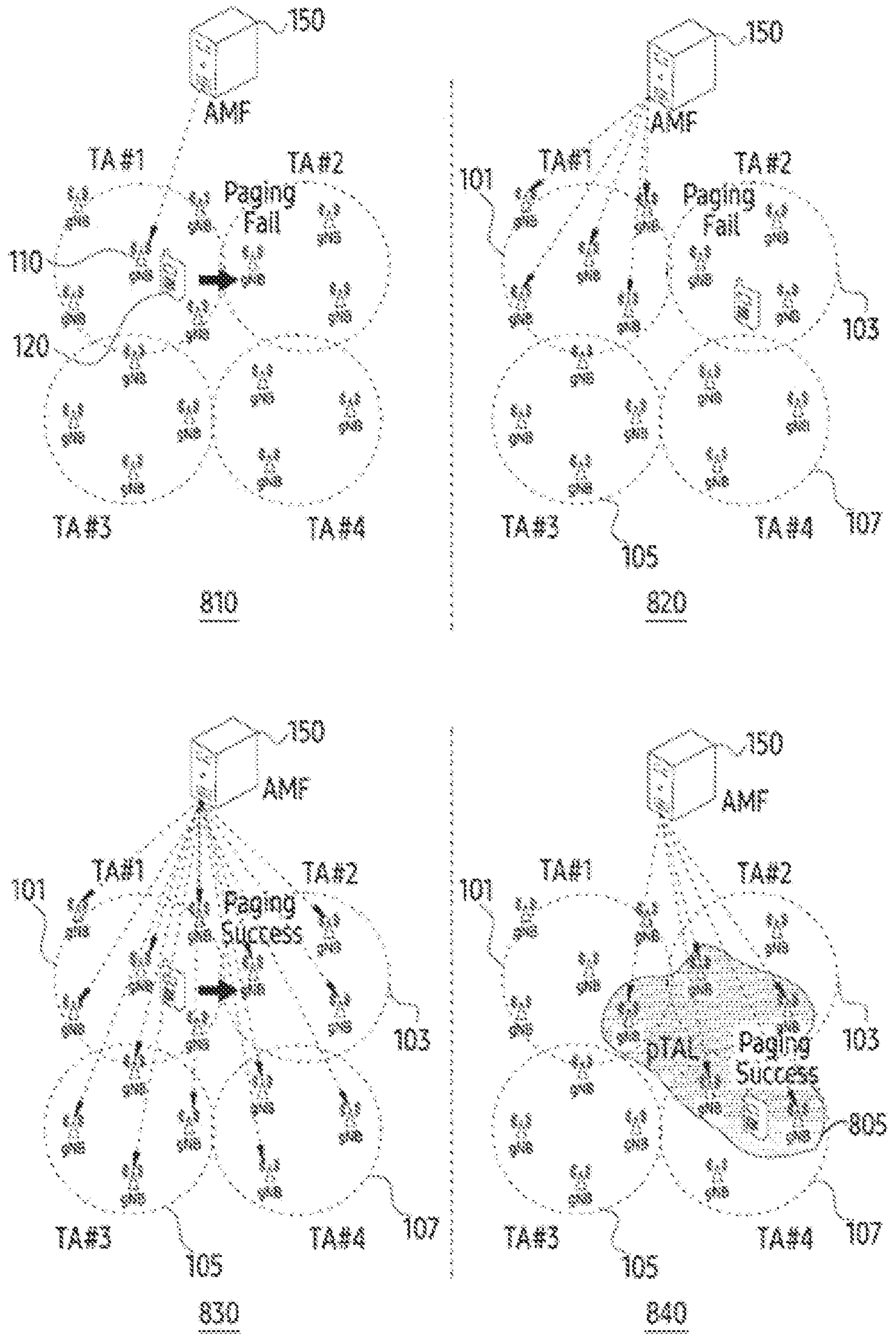
FIG. 8 is a diagram illustrating an example of a predicted tracking area and paging.

FIG. 8 is a diagram illustrating an example of a predicted tracking area and paging. The paging is illustrated, for example, by multi-step paging (e.g., 3-step paging illustrated in FIG. 1B). The final step of the multi-step paging may include broadcasting of paging meshes on all cells of a tracking area list (TAL) or predicted tracking area list (ie, pTAL).

Referring to FIG. 8, in paging, signaling generated in a tertiary paging step may be reduced through a pTAL 805 having a smaller size than the existing TAL (e.g., TAL configured with TA #1, TA #2, TA #3, and TA #4). The 3-step paging procedure may be performed in the order of a primary paging step 810 including paging to a cell of base station 110, a secondary paging step 820 including paging on cells in the tracking area list, and a tertiary paging step 830 including paging on all cells of the tracking area list. At this time, in the tertiary paging step 830, which is the final step, paging messages may be broadcast on all cells of a plurality of tracking areas included in the TAL. However, since the size of the TAL corresponds to all tracking areas in a commercial network, most of the paging signaling occurs in the tertiary paging step 830. Signaling overhead may occur due to paging performed regardless of the movement radius of the UE.

Through the pTAL 805 allocated based on the mobility of the UE, the number of signaling in the paging procedure may be reduced. For example, the tertiary paging step 830 of the multi-step paging may be replaced with the pTAL-based paging procedure 840. For another example, instead of the multi-step paging, the pTAL-based paging procedure 840 may be used as single-step paging. The size of the pTAL 805 may be smaller than that of another TAL (e.g., TAL configured with TA #1, TA #2, TA #3, and TA #4). When the size of the pTAL 805 decreases, the number of occurrences of registration procedures increases, but the number of signaling per paging procedure decreases. In addition, a mobility management device 150 may reduce the size of the pTAL 805 and simultaneously may reduce the number of the registration procedures by allocating the pTAL 805 based on the mobility of the UE 120. Thus, as the tertiary paging is performed based on the pTAL 805, overall signaling may be significantly reduced.

The number of signaling in the registration procedure and the number of signaling in the paging procedure according to the size of the pTAL 805 are in a trade-off relationship. The size of the pTAL 805 may be adjusted according to the geographical characteristic and the disposition of the base station. In addition, since mobility patterns are different for each UE, the UEs may have different pTAL sizes. The mobility management device 150 may reduce the frequency of the registration procedure by accurately predicting the mobility pattern of the UE 120 even if the size of the pTAL 805 is reduced. Meanwhile, UEs having a relatively wide movement radius, such as autonomous vehicles or drones, may use the size of the pTAL widely. In addition, the pTALs having a relatively small size may be allocated to the UEs in which the paging frequently occurs due to frequent traffic occurrence.

Figure 9A:
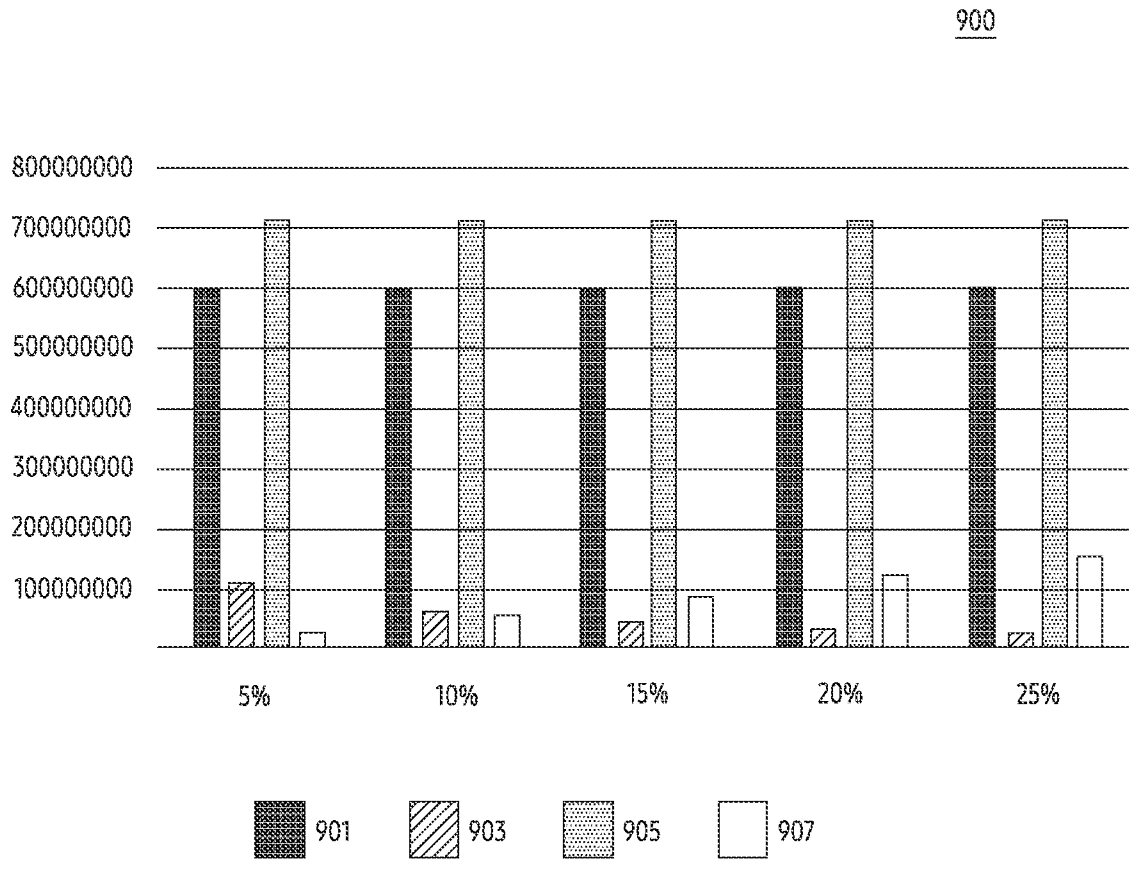
FIGS. 9A and 9B are graphs illustrating examples of performance of a predicted tracking
Figure 9B:
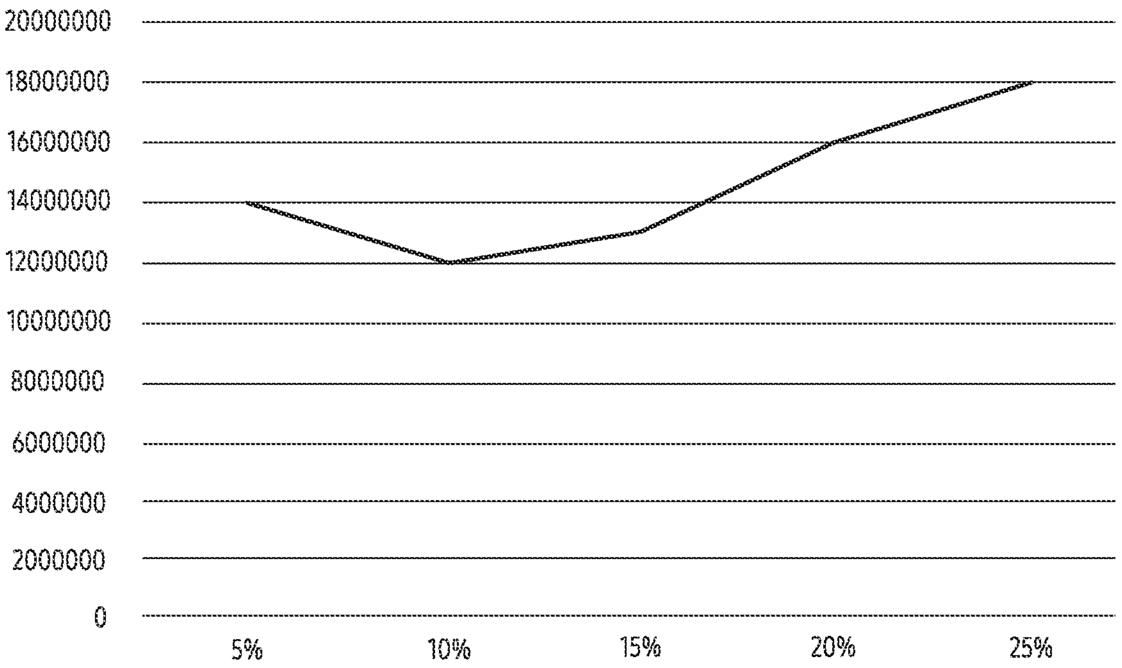

FIGS. 9A and 9B are graphs illustrating examples of performance of a predicted tracking. The predicted tracking area may refer, for example, to a tracking area within the above-described pTAL. Hereinafter, a list including the predicted tracking area is referred to as pTAL, and a list not including the predicted tracking area is referred to as TAL, a technical effect according to embodiments of the present disclosure is described.

Referring to FIG. 9A, a graph 900 indicates a relationship between the size of the pTAL and the number of signaling. The horizontal axis of the graph 900 indicates the ratio of the number of the gNBs of the pTAL among the total number of the gNBs of existing TALs. The vertical axis of the graph 900 indicates the number of signaling for each procedure. An index 901 indicates the number of signaling according to a TAL-based registration procedure. An index 903 indicates the number of signaling according to a pTAL-based registration procedure. An index 905 indicates the number of signaling according to a TAL-based paging procedure. An index 907 indicates the number of signaling according to a pTAL-based paging procedure.

In case that the size of the pTAL is configured to be about 5% to 25% compared to the existing TAL, it may be identified that the number of signaling generated by the registration procedure is reduced by about 85 to 95%, and the number of paging is reduced by about 68 to 87%. As the size of the pTAL increases, the probability that the UE is out of the movement path decreases, and therefore the number of signaling by the registration procedure decreases. As the size of the pTAL, in other words, the number of gNBs within the pTAL increases, the number of required paging messages increases. Based on the size of the pTAL, the number of registration procedures and the number of paging signaling have a trade-off relationship with each other. Thus, in order to find the optimal size of the pTAL, it is required to calculate the number of signaling required for the registration procedure and the paging procedure, in other words, the total signaling.

Referring to FIG. 9B, a graph 950 indicates the total number of signaling according to the pTAL size. The horizontal axis of the graph 950 indicates the ratio of the number of the gNBs of the pTAL among the total number of gNBs of existing TALs. The vertical axis of the graph 950 indicates the total number of signaling. The total signaling may refer, for example, to the sum of the number of signaling for the registration procedure and the number of signaling for the paging procedure. In the graph 950, it may be confirmed that the smallest number of signaling occurs when the pTAL having a size corresponding to a reference ratio (e.g., about 10%) is used. In the case of the pTAL having a size less than the reference ratio, the number of signaling by the registration procedure compared to the reference ratio increases. In the pTAL having a size greater than the reference ratio, the number of signaling by the paging procedure compared to the reference ratio increases.

According to an embodiment, a mobile electronic device (e.g., MME, AMF) or a computing device (e.g., AI learning device) connected to the mobile electronic device may obtain the reference ratio for the pTAL size based on the collected data. The mobile electronic device may configure the pTAL based on the reference ratio. The mobility electronic device may configure the pTAL based on one or more TALs, the reference ratio, and UE mobility information. Meanwhile, according to an additional embodiment, the mobile electronic device may adjust the size of the pTAL based on a state of a core network. For example, in case that the number of paging procedures needs to be reduced even if the number of registration procedures increases, the mobile electronic device may configure the pTAL at a rate lower than the reference rate. In addition, for example, in case that the number of registration procedures needs to be reduced even if the number of paging procedures increases, the mobile electronic device may configure the pTAL at a rate higher than the reference rate.

In embodiments of the present disclosure, a method of providing pTAL for each UE by applying a machine learning model to the core network (e.g., 5GC) of the mobile communication network has been described. In addition to reducing the number of paging procedures and the number of registration procedures, the prediction method is improved based on the time the UE stayed in a specific gNB, thereby reducing learning amount and providing high accuracy, for UE mobility.

Figure 10:
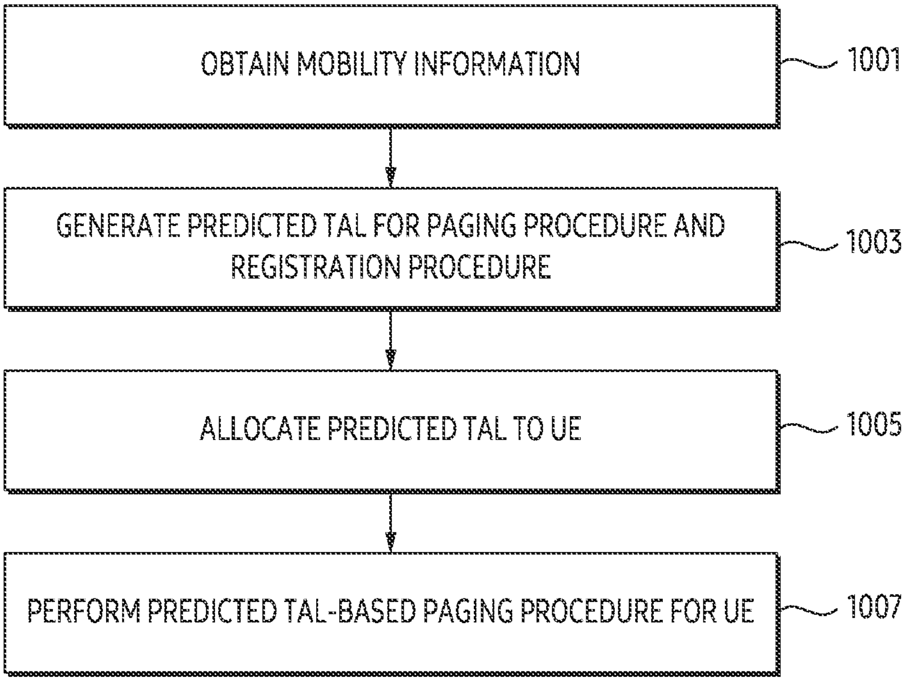
FIG. 10 is a flowchart illustrating an example operation of a mobility management device for providing a predicted tracking area.

FIG. 10 is a flowchart illustrating example operation of a mobility management device for providing a predicted tracking area. The mobility management device may refer, for example, to the mobility management device (e.g., MME, AMF) described with reference to FIGS. 1A to 9B.

Referring to FIG. 10, in operation 1001, a mobility management device 150 may obtain mobility information. The mobility management device 150 may obtain the mobility information for each UE. The mobility information of the UE may refer, for example, to information for indicating an expected movement path of the UE. According to an embodiment, the mobility information of the UE may be obtained based on at least one of a mobility pattern of the UE, an access history for each gNB of the UE, a residence time for each gNB, a movement path set in the UE, or information received from an external entity (e.g., NWDAF). The mobility pattern of the UE may refer, for example, to a pattern determined according to a learning result of the mobility information of the UE. The movement path set in the UE may refer, for example, to the designated path in case that the UE is set to perform repetitive motion or move along the designated path. In addition, according to an embodiment, the mobility information of the UE may be generated based on the learning result of the movement of the UE. For example, the learning result of vector information on the residence time for each gNB of the UE described in FIG. 4B may be used for the mobility information of the UE.

In operation 1003, the mobility management device 150 may generate a predicted TAL (pTAL) for a paging procedure and a registration procedure. The mobility management device 150 may generate the pTAL based on the mobility information of the UE. The pTAL may be UE-specific. The pTAL may be uniquely allocated for the UE.

The pTAL may be used as a list of TAI for paging. The mobility management device 150 may transmit a paging message including the pTAL to a node for paging (e.g., an NG-RAN node). As illustrated in FIG. 2, the mobility management device 150 may transmit the paging message including the pTAL to the node through an N2 interface. In addition, the pTAL may be used as the list of TAI for the registration procedure. The mobility management device 150 may transmit a registration accept message to the UE, in an initial access procedure or in response to a registration request procedure of the UE. The mobility management device 150 may transmit a registration accept message including the pTAL to the UE.

According to an embodiment, the mobility management device 150 may determine the pTAL. The pTAL may be determined based on a predicted movement path of the UE. Cells (or gNBs) associated with a geographical range of the predicted movement path of the UE may be included in the pTAL. The pTAL may include one or more tracking areas. The tracking area may be referred to as the predicted tracking area. Each predicted tracking area may include one or more cells. Each cell may be associated with the predicted movement path of the UE. For example, in case that the UE mobility information indicates the movement of the UE from the gNB of TAL #1 to the gNB of TAL #4, the pTAL may include the cell of the gNB of the TAL #1 and the cell of the gNB of the TAL #4. The pTAL may be referred to as a predicted registration area. In case that the UE moves within a range of the pTAL, it may not perform the registration procedure even if the TAL is changed. Even if the TAL is changed, since the UE does not perform the registration procedure, the number of registration procedures may be reduced.

According to an embodiment, the mobility management device 150 may determine the pTAL in a size smaller than that of a general TAL (e.g., the TAL that does not include the predicted tracking area). For example, the size of the TAL or the pTAL may be defined as the number of elements included in the list. In one example, the size of the list may refer to the number of tracking areas included in the list. In addition, in one example, the size of the list may refer to the number of base stations for tracking areas included in the list. In addition, in one example, the size of the list may refer to the number of cells included in the list. For another example, the size of the TAL or the pTAL may refer to a physical area covered by the list. By allocating the pTAL of a smaller size than the general TAL to the UE, the signaling number of the paging procedure for the UE in RRC idle mode may be reduced. Since the number of cells included in the pTAL is smaller than the number of cells included in the TAL, the number of paging messages broadcast per cell in the pTAL compared to the TAL may decrease.

Although not illustrated in FIG. 10, the mobility management device 150 may change the pTAL based on the movement of the UE. For example, when the UE moves out of a range of a pre-allocated pTAL, the mobility management device 150 may determine a new pTAL. That the UE moved out of the range of the pre-allocated pTAL may refer, for example, to the predicted movement path of the UE not being accurate. Based on receiving the registration request message of the UE, the mobility management device 150 may identify that the UE has moved out of the range of the pre-allocated pTAL. The mobility management device 150 may identify a new predicted movement path of the UE. As in the operation 1001, the mobility management device 150 may obtain new mobility information of the UE. The mobility management device 150 may determine the new pTAL based on the new mobility information.

In operation 1005, the mobility management device 150 may allocate the predicted TAL (pTAL) to the UE. The mobility management device 150 may provide the pTAL to the UE through NAS signaling. For example, the mobility management device 150 may provide the pTAL to the UE through an IE included in a registration accept message. For another example, the mobility management device 150 may provide the pTAL to the UE through an IE included in a configuration update command message. The UE may obtain the pTAL. When the UE moves out of an area range of the pTAL, it may perform the registration procedure. In order to reduce the number of signaling for the registration procedure, the pTALs may be formed across between TALs. Even if the UE moves from the TAL to another TAL, if it is within the pTAL, it may not perform the registration procedure. The mobility management device 150 may set the UE, so as not to perform the registration procedure if the UE is within the pTAL range.

In operation 1007, the mobility management device 150 may perform the predicted TAL-based paging procedure for the UE. The mobility management device 150 may identify notification of downlink data for the UE. The mobility management device 150 may perform the paging procedure, to change a network connected mode of the UE from the RRC idle mode or a RRC inactive mode to a RRC connected mode.

According to an embodiment, the mobility management device 150 may perform multi-step paging. The mobility management device 150 may perform the paging procedure with a cell to which the UE last accessed. The mobility management device 150 may broadcast the paging message through the base station of the cell to which the UE last accessed. In a subsequent step, the mobility management device 150 may perform the paging procedure on all cells in the tracking area to which the cell to which the UE last accessed belongs. The mobility management device 150 may transmit the paging message to the base stations of the cells. Thereafter, in the last step, the mobility management device 150 may perform the paging procedure within the entire range of the pTAL of the UE. The pTAL may include one or more predicted tracking areas. Each predicted tracking area may include one or more cells. The paging message may be broadcast in each cell of all cells indicated by the pTAL. The mobility management device 150 may transmit the paging messages to the RAN nodes (e.g., the gNBs) through the N2 interface. The paging message may include the pTAL.

According to an embodiment, the mobility management device 150 may perform the paging procedure based on the pTAL as single paging instead of the multi-step paging. Since the size of the pTAL is smaller than that of another TAL, the paging messages may be broadcast through each of the cells of the pTAL without a step-by-step procedure for efficiency of the procedure. The mobility management device 150 may transmit the paging messages to the RAN nodes (e.g., the gNBs) through the N2 interface. The paging message may include the pTAL.

The mobility management device 150 may ensure that the UE is within the pTAL range if it does not receive the registration request message from the UE. In addition, if the mobility management device 150 receives the registration request message from the UE, it may change the pTAL as illustrated in FIG. 6. Thus, the mobility management device 150 may ensure that the UE is positioned within the pTAL range currently set to the UE. The total number of paging signaling may be reduced by performing the paging procedure only within a range of pTALs smaller than all TALs, rather than performing the paging procedure on all TALs of the mobility management device 150.

The pTAL according to embodiments of the present disclosure may be used for both the registration area for the registration procedure and the TAI list for the paging procedure. In case that the TAI list set to the registration area and the TAI list indicated on the N2 interface are the same, an implementation of the present disclosure may be identified. In addition, as the movement path is changed, the pTAL allocated to the UE may be changed based on the registration procedure or a configuration update procedure.

Although not illustrated in FIG. 10, the mobility management device 150 may inform the UE or the RAN node of information (hereinafter, capability information) indicating that the function of the pTAL is supported. The mobility management device 150 may transmit the capability information to the UE through a NAS message in order to inform that the pTAL may be used in the registration procedure. The NAS message may be transmitted on the N1 interface. In addition, the mobility management device 150 may transmit a message including the capability information to the RAN node in order to inform that the pTAL may be used in the paging procedure. The message may be transmitted on the N2 interface.

Figure 11:
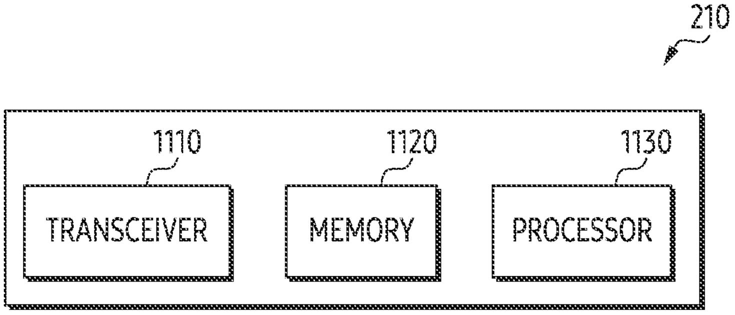
FIG. 11 is a block diagram illustrating an example configuration of a mobility management device for providing a predicted tracking area.

FIG. 11 is a block diagram illustrating an example configuration of a mobility management device for providing a predicted tracking area. The mobility management device may refer, for example, to a mobility management device 150 (e.g., MME, AMF) described with reference to FIGS. 1A to 10. The configuration illustrated in FIG. 11 may be understood as a configuration of the mobility management device 150. The terms '. . . unit', '. . . er', and the like used below may refer, for example, to a unit including various circuitry and/or executable program instructions that processes at least one function or operation, and it may be implemented by hardware or software, or a combination of hardware and software.

Referring to FIG. 11, the mobility management apparatus 150 includes a transceiver (e.g., including communication circuitry) 1110, a memory 1120, and a processor (e.g., including processing circuitry) 1130.

The transceiver 1110 may include various communication circuitry and perform functions for transmitting and receiving a signal in a wired communication environment. The transceiver 1110 may include a wired interface for controlling a direct connection between the device and the device through a transmission medium (e.g., copper wire, optical fiber). The transceiver 1110 may support an N2 interface. For example, the transceiver 1110 may transmit an electrical signal to a node of the base station (e.g., gNB, gNB-CU, gNB-CU-CP) or may perform conversion between the electrical signal and an optical signal through the copper wire. The mobility management device 150 may be connected to one or more base stations through the transceiver 1110. For example, the transceiver 1110 may transmit a paging message to a corresponding base station.

The transceiver 1110 may perform functions for transmitting and receiving the signal in a wireless communication environment. The transceiver 1110 may support an N1 interface. The mobility management device 150 may support NAS signaling through the transceiver 1110. The mobility management device 150 may transmit a NAS message to the UE through the transceiver 1110. For example, the transceiver 1110 may receive a registration request message from the UE. The transceiver 1110 may transmit a registration accept message to the UE.

The transceiver 1110 transmits and receives the signal as described above. Accordingly, all or part of the transceiver 1110 may be referred to as a 'communication unit', a 'transmission unit', a 'reception unit', or a 'transmission/reception unit'. In addition, in the following description, transmission and reception performed through a wireless channel are used as meaning including that the above-described processing is performed by the transceiver 1110. Although only the transceiver 1110 is illustrated in FIG. 11, according to another implementation example, the mobility management device 150 may include two or more transceivers.

Although not illustrated in FIG. 11, the transceiver 1110 may further include the transceiver for being connected to another entity (e.g., NWDAF) of a core network. The transceiver provides an interface for performing communication with other nodes in the network. In other words, the backhaul transceiver converts a bit string transmitted from the base station to another node, for example, another access node, another base station, an upper node, a core network, and the like into a physical signal, and converts a physical signal received from another node into a bit string.

The memory 1120 stores data such as a basic program, an application program, and setting information, for an operation of an electronic device. The memory 1120 may be referred to as a storage unit. The memory 1120 may be configured with volatile memory, non-volatile memory, or a combination of volatile and non-volatile memory. In addition, the memory 1120 provides the stored data according to the request of the processor 1130.

The processor 1130 may include various processing circuitry and controls overall operations of the electronic device. The processor 1180 may be referred to as a control unit. For example, the processor 1130 transmits and receives the signal through the transceiver 1110 (or through a backhaul communication unit). In addition, the processor 1130 records and reads data in the memory 1120. In addition, the processor 1130 may perform functions of the protocol stack required by the communication standard. Although only the processor 1130 is illustrated in FIG. 11, according to another implementation example, the mobility management device 150 may include two or more processors.

The configuration of the electronic device illustrated in FIG. 11 is only an example, and an example of the mobility management device performing embodiments of the present disclosure is not limited from the configuration illustrated in FIG. 11. In embodiments, some configuration may be added, deleted, or changed.

The electronic device and method according to various example embodiments of the present disclosure may more efficiently predict the movement path of the UE by learning a residence time for each base station of the UE.

An electronic device and method according to various example embodiments of the present disclosure may reduce signaling of a registration procedure and a paging procedure, by predicting the movement path of the UE and by configuring a predicted tracking area list based on the result of the prediction.

The effects obtainable in the present disclosure are not limited to the effects mentioned above, and other effects not mentioned may be able to be clearly understood by those skilled in the art to which the present disclosure belongs from the following description.

In various example embodiments, a method performed by a mobility management device, may comprise obtaining mobility information of a user equipment (UE). The method may comprise generating a predicted tracking area list for the UE based on the mobility information. The method may comprise transmitting, to the UE, a message including the predicted tracking area list to initiate a registration procedure based on the UE being out of a range of a plurality of tracking areas of the predicted tracking area list. The method may comprise based on identifying downlink data for the UE, performing a paging procedure in each of cells in the predicted tracking area list.

According to an example embodiment, the message may comprise a registration accept message.

According to an example embodiment, the method may further comprise receiving, from the UE, a registration request message. The method may comprise, based on the receiving of the registration request message, identifying that the UE is out of the range. The method may comprise, based on identifying that the UE is out of the range, generating another predicted tracking area list for the UE.

According to an example embodiment, the performing of the paging procedure may comprise transmitting a paging message to a base station of a cell within the predicted tracking area list. The paging message may include information for the predicted tracking area list.

According to an example embodiment, the mobility information of the UE may be determined based on at least one of a previous access history of the UE, a mobility pattern of the UE, an access time of the UE for each base station, or a paging history of the UE.

According to an example embodiment, the mobility information of the UE may be determined based on a result of a machine learning for a moving vector of the UE. Each element of the moving vector may indicate a residence time in a base station corresponding to a position of a corresponding element.

According to an example embodiment, the mobility information of the UE may be obtained from a network data analytics function (NWDAF).

According to an example embodiment, the mobility information of the UE may comprise a movement path of the UE.

The movement path of the UE may be associated with a first cell of a first tracking area list and a second cell of a second tracking area list. The predicted tracking area list may include the first cell of the first tracking area list and the second cell of the second tracking area list. A geographical area by the first tracking area list may be different from a geographical area by the second tracking area list.

According to an example embodiment, the number of cells within the predicted tracking area list may be less than the number of cells within the first tracking area list. The number of cells within the predicted tracking area list may be less than the number of cells within the second tracking area list.

According to an example embodiment, the mobility management device may comprise an access and mobility management function (AMF) or a mobility management entity.

According to various example embodiments, a mobility management device may comprise at least one transceiver, and at least one processor coupled to the at least one transceiver. The at least one processor may be configured to obtain mobility information of a user equipment (UE). The at least one processor may be configured to generate a predicted tracking area list for the UE based on the mobility information. The at least one processor may be configured to control the at least one transceiver to transmit, to the UE, a message including the predicted tracking area list to initiate a registration procedure based on the UE being out of a range of a plurality of tracking areas of the predicted tracking area list; and The at least one processor may be configured to, based on identifying downlink data for the UE, perform a paging procedure in each of cells in the predicted tracking area list.

According to an example embodiment, the message may comprise a registration accept message.

According to an example embodiment, the at least one processor may be configured to receive, from the UE, a registration accept message. The at least one processor may be configured to, based on the receiving of the registration request message, identify that the UE is out of the range. The at least one processor may be configured to, based on identifying that the UE is out of the range, generate another predicted tracking area list for the UE.

According to an example embodiment, the at least one processor may be, to perform the paging procedure, configured to control the at least one transceiver to transmit a paging message to a base station of a cell within the predicted tracking area list. The paging message may include information for the predicted tracking area list.

According to an example embodiment, the mobility information of the UE may be determined based on at least one of a previous access history of the UE, a mobility pattern of the UE, an access time of the UE for each base station, or a paging history of the UE.

According to an example embodiment, the mobility information of the UE may be determined based on a result of a machine learning for a moving vector of the UE. Each element of the moving vector may indicate a residence time in a base station corresponding to a position of a corresponding element.

According to an example embodiment, the mobility information of the UE may be obtained from a network data analytics function (NWDAF).

According to an example embodiment, the mobility information of the UE may comprise a movement path of the UE. The movement path of the UE may be associated with a first cell of a first tracking area list and a second cell of a second tracking area list. The predicted tracking area list may include the first cell of the first tracking area list and the second cell of the second tracking area list. A geographical area by the first tracking area list may be different from a geographical area by the second tracking area list.

According to an example embodiment, the number of cells within the predicted tracking area list may be less than the number of cells within the first tracking area list. The number of cells within the predicted tracking area list may be less than the number of cells within the second tracking area list.

According to an example embodiment, the mobility management device may comprise an access and mobility management function (AMF) or a mobility management entity (MME).

According to various example embodiments, a non-transitory computer-readable medium is provided. The non-transitory computer-readable medium is provisioned with program instructions that, when executed by one or more processors, cause a mobility management device to perform functions comprising obtaining mobility information of a user equipment (UE), generating a predicted tracking area list for the UE based on the mobility information, transmitting, to the UE, a message including the predicted tracking area list to initiate a registration procedure based on the UE being out of a range of a plurality of tracking areas of the predicted tracking area list, and based on identifying downlink data for the UE, performing a paging procedure in each of cells in the predicted tracking area list.

For one or more embodiments, at least one of the components set forth in one or more of the preceding figures may be configured to perform one or more operations, techniques, processes, and/or methods as set forth herein. For example, a processor (e.g., baseband processor) as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described example embodiments may be combined with any other embodiment (or combination of embodiments), unless explicitly stated otherwise. The foregoing description of one or more implementations provides illustration and description, but is not intended to be exhaustive or to limit the scope of the various example embodiments to the precise form disclosed. Modifications and variations are possible in light of the above teachings or may be acquired from practice of various embodiments.

The methods according to various embodiments described in the claims and/or the disclosure may be implemented in hardware, software, or a combination of hardware and software.

When implemented by software, a non-transitory computer-readable storage medium storing one or more programs (software modules) may be provided. One or more programs stored in such a computer-readable storage medium (e.g., non-transitory storage medium) are configured for execution by one or more processors in an electronic device. The one or more programs include instructions that cause the electronic device to execute the methods according to various example embodiments described in the claims or the disclosure.

Such a program (e.g., software module, software) may be stored in a random-access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs), other types of optical storage devices, or magnetic cassettes. Alternatively, it may be stored in a memory configured with a combination of some or all of the above. In addition, respective memories may be provided in a multiple number.

Further, the program may be stored in an attachable storage device that can be accessed via a communication network, such as e.g., Internet, Intranet, local area network (LAN), wide area network (WAN), or storage area network (SAN), or a communication network configured with a combination thereof. Such a storage device may access an apparatus performing an embodiment of the disclosure through an external port. Further, a separate storage device on the communication network may be accessed to an apparatus performing an embodiment of the disclosure.

In the above-described various example embodiments of the disclosure, a component included therein may be expressed in a singular or plural form according to a specific embodiment. However, such a singular or plural expression may be selected appropriately for the presented context for the convenience of description, and the disclosure is not limited to the singular form or the plural elements. Therefore, either an element expressed in the plural form may be formed of a singular element, or an element expressed in the singular form may be formed of plural elements.

According to various embodiments, each component (e.g., a module or a program) of the above-described components may include a single entity or multiple entities, and some of the multiple entities may be separately disposed in different components. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art the various changes in form and detail may be made without departing from the true spirit and full scope of the disclosure, including the appended claims and their equivalents.

What is claimed is:

1. A method performed by a mobility management device, the method comprising:

obtaining mobility information of a user equipment (UE);

determining a size of a predicted tracking area list for the UE to minimize a total number of signaling messages in a network based on the mobility information, wherein the total number of signaling messages is a sum of signaling messages for a registration procedure and a paging procedure expected according to the size of the predicted tracking area list;

generating the predicted tracking area list for the UE based on the mobility information and the size of the predicted tracking area list;

transmitting, to the UE, a message including the predicted tracking area list to initiate the registration procedure based on the UE being out of a range of a plurality of tracking areas of the predicted tracking area list; and based on identifying downlink data for the UE, performing the paging procedure in each of cells in the predicted tracking area list.

2. The method of claim 1, wherein the message comprises a registration accept message.

3. The method of claim 1, further comprising:

receiving, from the UE, a registration request message;

based on the receiving of the registration request message, identifying that the UE is out of the range; and based on identifying that the UE is out of the range, generating another predicted tracking area list for the UE.

4. The method of claim 1, wherein the performing of the paging procedure comprises transmitting a paging message to a base station of a cell within the predicted tracking area list, and wherein the paging message includes information for the predicted tracking area list.

5. The method of claim 1, wherein the mobility information of the UE is determined based on at least one of a previous access history of the UE, a mobility pattern of the UE, an access time of the UE for each base station, or a paging history of the UE.

6. The method of claim 1, wherein the mobility information of the UE is determined based on a result of machine learning for a moving vector of the UE, and wherein each element of the moving vector indicates a residence time in a base station corresponding to a position of a corresponding element.

7. The method of claim 1, wherein the mobility information of the UE is obtained from a network data analytics function (NWDAF).

8. The method of claim 1, wherein the mobility information of the UE comprises a movement path of the UE, wherein the movement path of the UE is associated with a first cell of a first tracking area list and a second cell of a second tracking area list, wherein the predicted tracking area list includes the first cell of the first tracking area list and the second cell of the second tracking area list, and wherein a geographical area by the first tracking area list is different from a geographical area by the second tracking area list.

9. The method of claim 8, wherein the number of cells within the predicted tracking area list is less than the number of cells within the first tracking area list, and wherein the number of cells within the predicted tracking area list is less than the number of cells within the second tracking area list.

10. The method of claim 1, wherein the mobility management device comprises an access and mobility management function (AMF) or a mobility management entity.

11. A mobility management device comprising:

at least one transceiver; and at least one processor coupled to the at least one transceiver, wherein the at least one processor is configured to:

obtain mobility information of a user equipment (UE);

determine a size of a predicted tracking area list for the UE to minimize a total number of signaling messages in a network based on the mobility information, wherein the total number of signaling messages is a sum of signaling messages for a registration procedure and a paging procedure expected according to the size of the predicted tracking area list;

generate the predicted tracking area list for the UE based on the mobility information and the size of the predicted tracking area list;

control the at least one transceiver to transmit, to the UE, a message including the predicted tracking area list to initiate the registration procedure based on the UE being out of a range of a plurality of tracking areas of the predicted tracking area list; and based on identifying downlink data for the UE, perform the paging procedure in each of cells in the predicted tracking area list.

12. The mobility management device of claim 11, wherein the message comprises a registration accept message.

13. The mobility management device of claim 11, wherein the at least one processor is further configured to:

receive, from the UE, via the at least one transceiver, a registration request message;

based on the receiving of the registration request message, identify that the UE is out of the range; and based on identifying that the UE is out of the range, generate another predicted tracking area list for the UE.

14. The mobility management device of claim 11, wherein the at least one processor is further configured to perform the paging procedure, configured to control the at least one transceiver to transmit a paging message to a base station of a cell within the predicted tracking area list, and wherein the paging message includes information for the predicted tracking area list.

15. The mobility management device of claim 11, wherein the mobility information of the UE is determined based on at least one of a previous access history of the UE, a mobility pattern of the UE, an access time of the UE for each base station, or a paging history of the UE.

16. The mobility management device of claim 11, wherein the mobility information of the UE is determined based on a result of machine learning for a moving vector of the UE, and wherein each element of the moving vector indicates a residence time in a base station corresponding to a position of a corresponding element.

17. The mobility management device of claim 11, wherein the mobility information of the UE is obtained from a network data analytics function (NWDAF).

18. The mobility management device of claim 11, wherein the mobility information of the UE comprises a movement path of the UE, wherein the movement path of the UE is associated with a first cell of a first tracking area list and a second cell of a second tracking area list, wherein the predicted tracking area list includes the first cell of the first tracking area list and the second cell of the second tracking area list, and wherein a geographical area by the first tracking area list is different from a geographical area by the second tracking area list.

19. The mobility management device of claim 18, wherein the number of cells within the predicted tracking area list is less than the number of cells within the first tracking area list, and wherein the number of cells within the predicted tracking area list is less than the number of cells within the second tracking area list.

20. A non-transitory computer-readable medium, wherein the non-transitory computer-readable medium is provisioned with program instructions that, when executed by one or more processors, cause a mobility management device to perform functions comprising:

obtaining mobility information of a user equipment (UE);

determining a size of a predicted tracking area list for the UE to minimize a total number of signaling in a network based on the mobility information, wherein the total number of signaling is a sum of signaling for a registration procedure and a paging procedure expected according to the size of the predicted tracking area list;

generating the predicted tracking area list for the UE based on the mobility information and the size of the predicted tracking area list;

transmitting, to the UE, a message including the predicted tracking area list to initiate the registration procedure based on the UE being out of a range of a plurality of tracking areas of the predicted tracking area list; and based on identifying downlink data for the UE, performing the paging procedure in each of cells in the predicted tracking area list.

* * * * *